United States Patent [19]

Levine et al.

[11] Patent Number: 5,214,414
[45] Date of Patent: May 25, 1993

[54] CURSOR FOR LCD DISPLAYS

[75] Inventors: James L. Levine; Gregory F. Russell, both of Yorktown Heights, N.Y.

[73] Assignee: International Business Machines Corp., Armonk, N.Y.

[21] Appl. No.: 685,322

[22] Filed: Apr. 12, 1991

[51] Int. Cl.$^5$ .............................................. G09G 3/02
[52] U.S. Cl. ..................................... 340/709; 340/710; 340/711; 340/728
[58] Field of Search ............... 340/709, 710, 711, 706, 340/724

[56] References Cited

U.S. PATENT DOCUMENTS 4,649,333  3/1987  Takeda et al. .
4,663,616  5/1987  Himelstein .
4,691,200  9/1987  Stephany .
4,751,502  6/1988  Ishii et al. .
4,766,423  8/1988  Ono et al. .......................... 340/709
4,808,979  2/1989  DeHoff et al. .
4,841,291  6/1989  Swix et al. .

FOREIGN PATENT DOCUMENTS 1-200398  7/1989  Japan .
1-169622  8/1989  Japan .
0049009   9/1990  Japan ................................. 340/709

Primary Examiner—Ulysses Weldon
Attorney, Agent, or Firm—Perman & Green

[57] ABSTRACT

A method displays a visual "trail" (12b) behind a moving cursor (12a) so that the cursor does not disappear from a liquid crystal display (12) during rapid cursor movement. The method interpolates and displays one or more intermediate cursor locations between a previous cursor location and a present cursor location. A method also extrapolates one or more future cursor locations (12c) from a present location and prematurely turns on, or biases, pixels located at the extrapolated future locations so that a significantly shorter period of time is required to cause the pixels to become visually distinct. The method also interpolates intermediate cursor locations between the present location and the one or more extrapolated locations and prematurely turns on the pixels at the interpolated locations.

13 Claims, 3 Drawing Sheets

CURSOR FOR LCD DISPLAYS

FIELD OF THE INVENTION

This invention relates generally to display control apparatus and method and, in particular, relates to apparatus and method that enhances the visibility of a moving cursor on a liquid crystal display (LCD).

BACKGROUND OF THE INVENTION

Display cursors that are driven by a mouse, a touch-entry device, a stylus device, etc., have become an essential feature of many computer programs. However, when a matrix crystal display, such as an LCD, is used, as in most portable computers, the cursor is found to be nearly invisible when in motion. Once lost from sight, visually relocating the cursor can be a slow process, especially if the background display is complex.

The problem of cursor invisibility results from a relatively slow response speed of the liquid crystal material. That is, before the pixels that represent the cursor become visible at a current cursor position, the cursor is erased from the current position and rewritten at a new position. As this process is repeated in rapid succession, due to movement of the cursor by the operator, the cursor never dwells at one location long enough to become visible to a user of the system.

It is thus an object of the invention to provide method and apparatus to improve the visibility of a cursor when used with a display having a response time that is approximately equal to or greater than a dwell time of a cursor at a given display position.

SUMMARY OF THE INVENTION

The foregoing and other problems are overcome and the object of the invention is realized by a method, and apparatus for accomplishing the method, of operating a display device that is coupled during use to a data processor. The method includes the steps of, in response to an input directing a movement of a displayed image from a first location, (a) displaying the image at a second location; (b) interpolating one or more intermediate locations between the first location and the second location; and (c) displaying an image at each of the interpolated intermediate locations. The method further includes the steps of (d) determining if one or more of the displayed images has been displayed for a period of time equal to or greater than a predetermined maximum time; and (e) if so, erasing the displayed image determined to have been displayed for the period of time equal to or greater than the predetermined maximum time. The method further includes the optional steps of (f) extrapolating one or more probable future locations of the displayed image; and (g) initiating the display of the image at the extrapolated locations. For the case where steps (f) and (g) are executed the method includes a step, executed in response to a subsequent determination that an extrapolated future location is not a correct location, of (h) terminating the display of the image at the extrapolated location before the image becomes visible to a user. The method also provides for interpolating one or more image positions between the extrapolated future positions.

In accordance with the invention the operation of the method serves to display a visual "trail" behind a moving cursor so that the cursor does not disappear from a display during rapid cursor movement. The method also operates to extrapolate the one or more future cursor locations from a present location and to prematurely turn on, or bias, display pixels located at the extrapolated future locations so that a significantly shorter period of time is required to cause the pixels to become visually distinct.

BRIEF DESCRIPTION OF THE DRAWING

The above set forth and other features of the invention are made more apparent in the ensuing Detailed Description of the Invention, when read in conjunction with the attached Drawing, wherein.

DETAILED DESCRIPTION OF THE INVENTION

Figure 1:
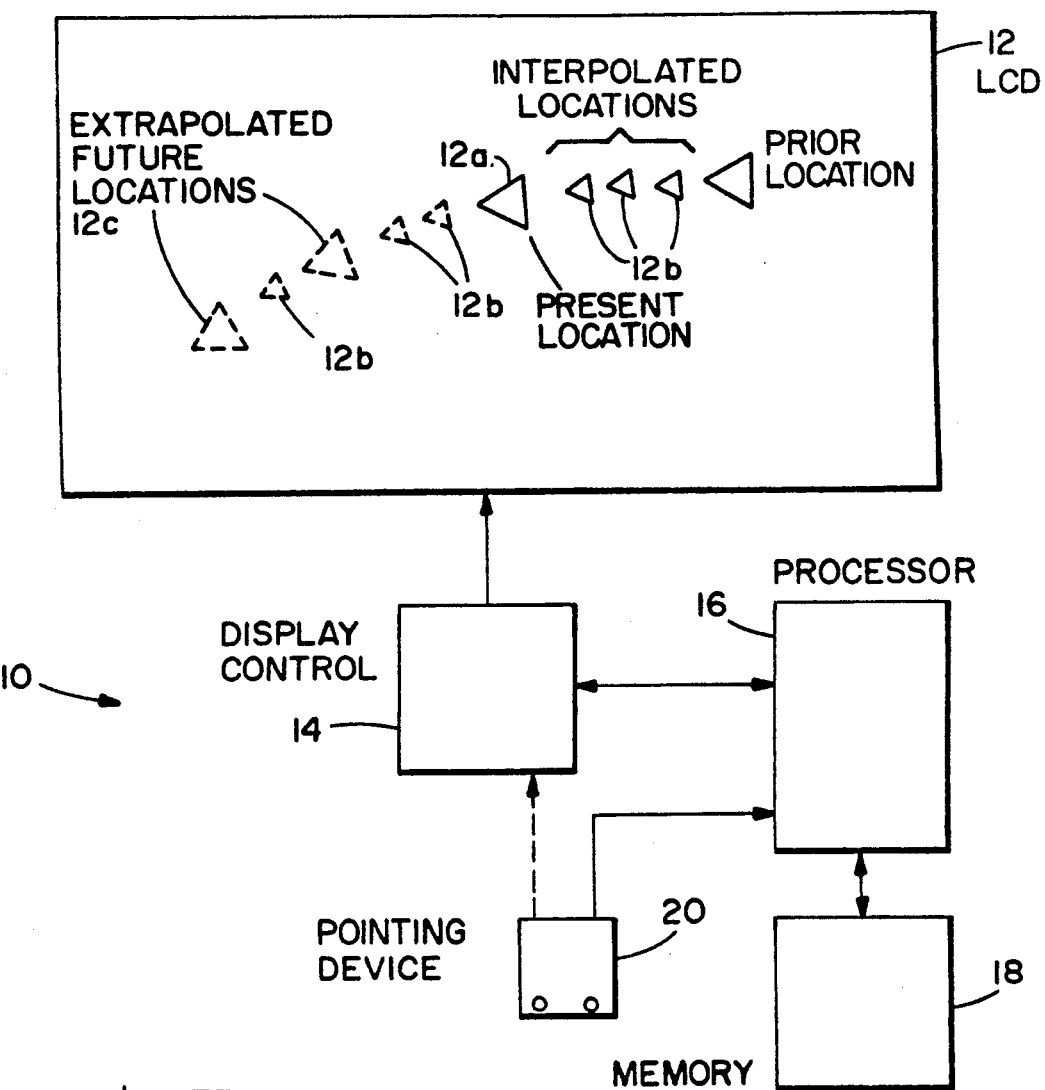
FIG. 1 is a block diagram of a data processing system that includes an LCD display.

Referring to FIG. 1 there is illustrated a data processing system 10 that operates in accordance with the invention. Data processing system 10 may be, by example, a battery operated portable computer. System 10 includes an LCD 12 comprised of a plurality of liquid crystal pixels arranged in a two-dimensional array. A display control 14 is coupled to the LCD 12 for generating visible images thereon. LCD 12 may be operated by the display control 14 in an alphanumerics text mode having some predetermined number of rows of alphanumeric characters. The LCD 12 may also be operated in an all points addressable (APA) mode of operation. In either mode a cursor 12a may be required to be displayed, the cursor 12a including some predetermined number of pixels having a predetermined shape. For example, when operating in the alphanumeric text mode, the cursor may be an image of a short line or a character-sized rectangle for indicating a particular row and column. The cursor 12a may also be used in the APA mode as a moveable pointer to a screen image or area. The use of a cursor for these various functions is well known in the art and will not be further discussed herein.

System 10 also includes a data processor 16 that is coupled to the display control 14 for controlling the operation thereof. A memory 18 is coupled to the processor 16 and includes program memory and temporary memory. The program memory includes instructions for operating the system 10 in accordance with the methods of the invention. A pointing device 20 is coupled to the processor 16 and is employed during use of the system 10 for indicating a new location or direction of motion and a speed of motion of the cursor 12a. Pointing device 20 may be one or more keys on a computer keyboard, a mouse, a touch sensitive screen, a digitizing tablet, or any of a number of suitable input means for causing motion of the cursor 12a.

Figure 2:
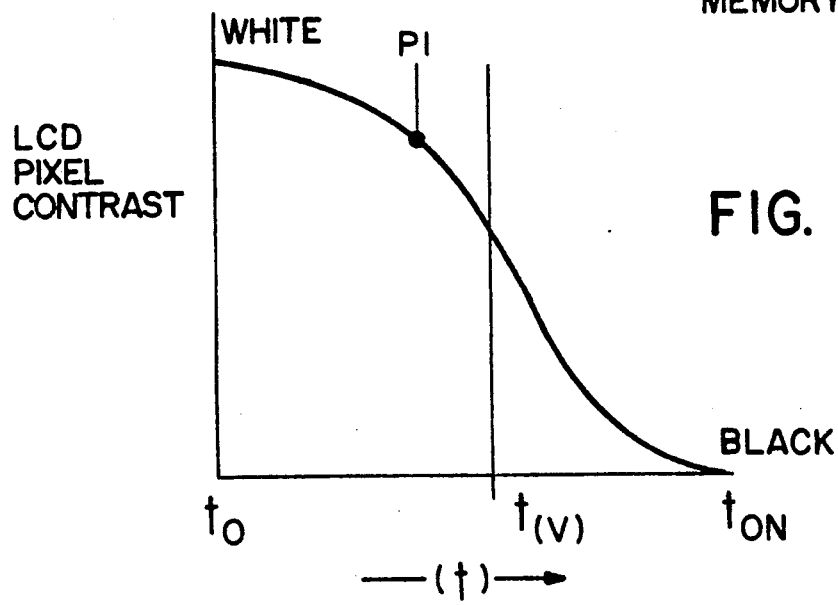
FIG. 2 is a graph illustrating a change in LCD pixel contrast as a function of time.

Referring to FIG. 2 there is shown a graph that plots a change in LCD pixel contrast over time. At to a pixel is energized and begins a transition from an "off" state, which typically visually appears to be white, amber, or some other color, to an "on" state that visually contrasts with the off state. For example, the LCD pixel transitions between a white and a black visual image. The totally "on" state is reached at time $t_{on}$. As can be seen, the transition from the "off" state to the "on" state is not linear and requires a finite amount of time. For example, for a typical LCD approximately 150 milliseconds is required to transition from the "off" state to the "on" state, and vice versa. However "new" cursor positions may be generated at, for example, a 60 Hz rate, or one every approximately 16 milliseconds.

As can be appreciated, if the cursor 12a is in motion such that it resides, or dwells, at a given display location for less than some threshold time $t(\nu)$ that is required to achieve visibility, the cursor 12a will not be visible to the user. This is because the display controller 14 normally energizes, or turns on, a new set of LCD pixels that correspond to the present location of the cursor 12a, while turning off the set of pixels that correspond to the previous location of the cursor 12a. If a set of pixels is not energized for at least a period of time equal to $t(\nu)$, then the cursor 12a will not be visible while in motion at a rate greater than a critical rate ($R_c$). The critical rate is a rate that results in the cursor pixel dwell time, at a given display location, being less than $t(\nu)$.

Figure 3:
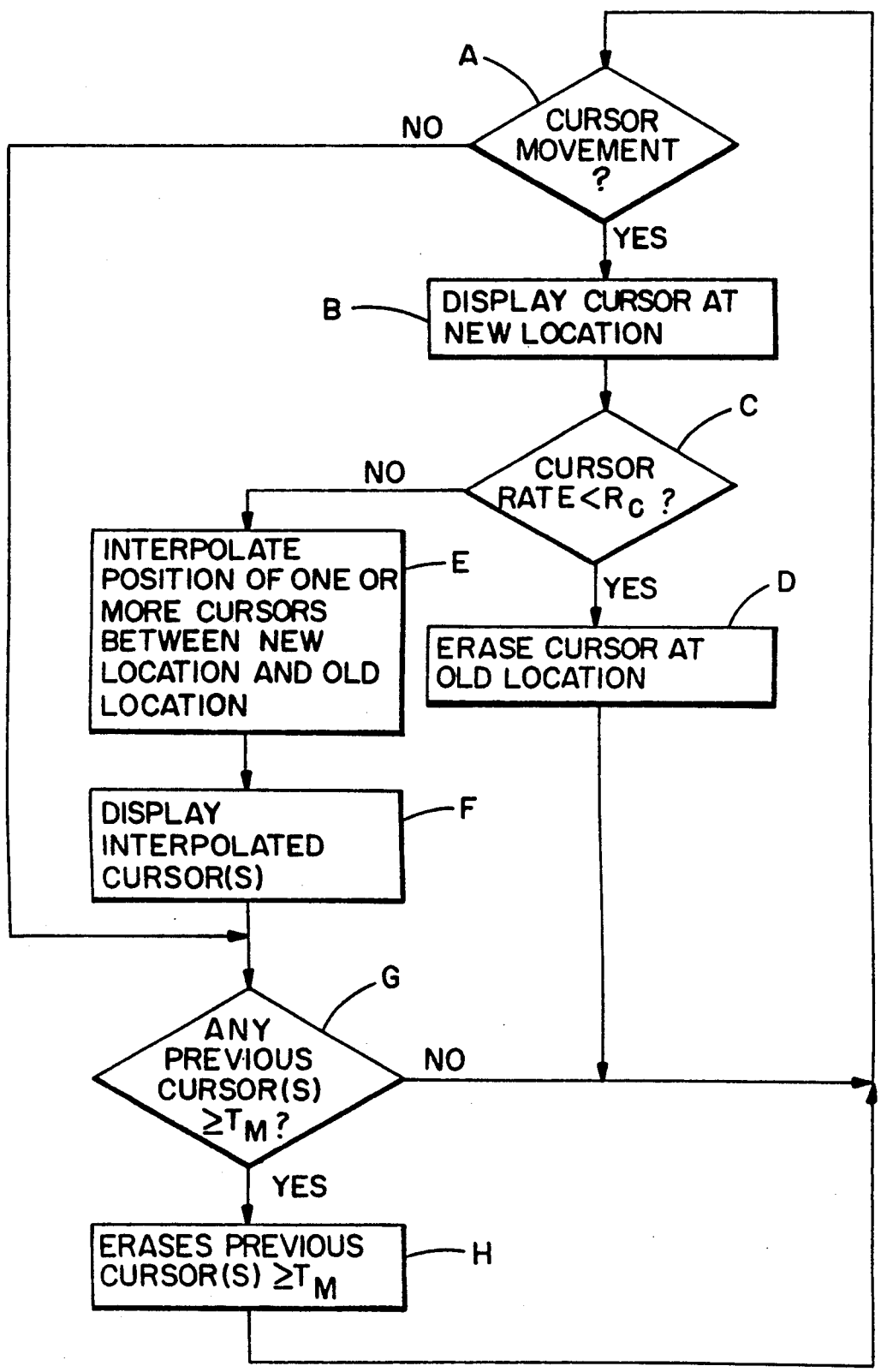
FIG. 3 is a flowchart illustrating one method of the invention that maintains previously drawn cursors for a period of time that is sufficient to provide a visual indication of cursor motion.

Referring to FIG. 3 there is shown a first method of the invention for overcoming this problem. At block A a determination is made if cursor movement is required. If yes, at block B the processor 16 causes the display controller 14 to display the cursor at a new location. At block C a determination is made if the cursor motion rate is less than the critical rate $R_c$. If yes, the cursor is erased, that is, the set of pixels is turned off at the previous cursor location and the method returns to block A. For this condition, wherein the rate of cursor movement is less than the critical rate, it is assumed that the cursor 12a dwells at the new location for a period of time sufficient for the LCD pixels corresponding to the cursor to become visually distinct.

If at block C the cursor rate is found to exceed $R_c$ the processor 16 interpolates one or more cursor positions between the newly displayed location (block B) and the previous cursor location. At block F the one or more interpolated cursor locations are displayed. The actual number of cursor locations that are interpolated is variable, depending upon the cursor rate, the cursor size, etc., with the goal being to display an image behind the moving cursor, the image clearly indicating the direction of cursor movement. In this regard it should be noted that it is not essential to display, at each of the interpolated positions, an image that corresponds exactly to that of the cursor, so long as the resultant image clearly indicates the direction of cursor motion. That is, arbitrarily simplified cursor images may be displayed at each of the interpolated cursor positions. For each displayed cursor or interpolated cursor a time of display is recorded by the processor 16 as is the displayed location of the image.

At block G a check is made to determine if any previously drawn, but not yet erased, cursors or interpolated cursors have been displayed for a period of time equal to or greater than a predetermined maximum display time ($T_M$). The value of $T_M$ is greater than $t(\nu)$ and is assigned a value that provides a visual indication of cursor position. For example, a suitable value may be one second. If the determination at block G is no, then a return is made to block A. If the determination at block G is yes, then at block H a cursor or cursors that have been displayed for a period of time equal to or greater than $T_M$ are erased.

This method also includes, within the NO loop attached to block A, a transfer to block G to determine if more than one cursor is displayed and, if so, erasing the cursor(s) that have been displayed for a period of time equal to or exceeding $T_M$. This prevents, in the case of a sudden cessation of cursor movement, a plurality of cursors remaining displayed.

The operation of the method of FIG. 3 serves to display a visual "trail" (12b) behind a moving cursor so that the cursor does not disappear from the display 12 during cursor movement.

Figure 4:
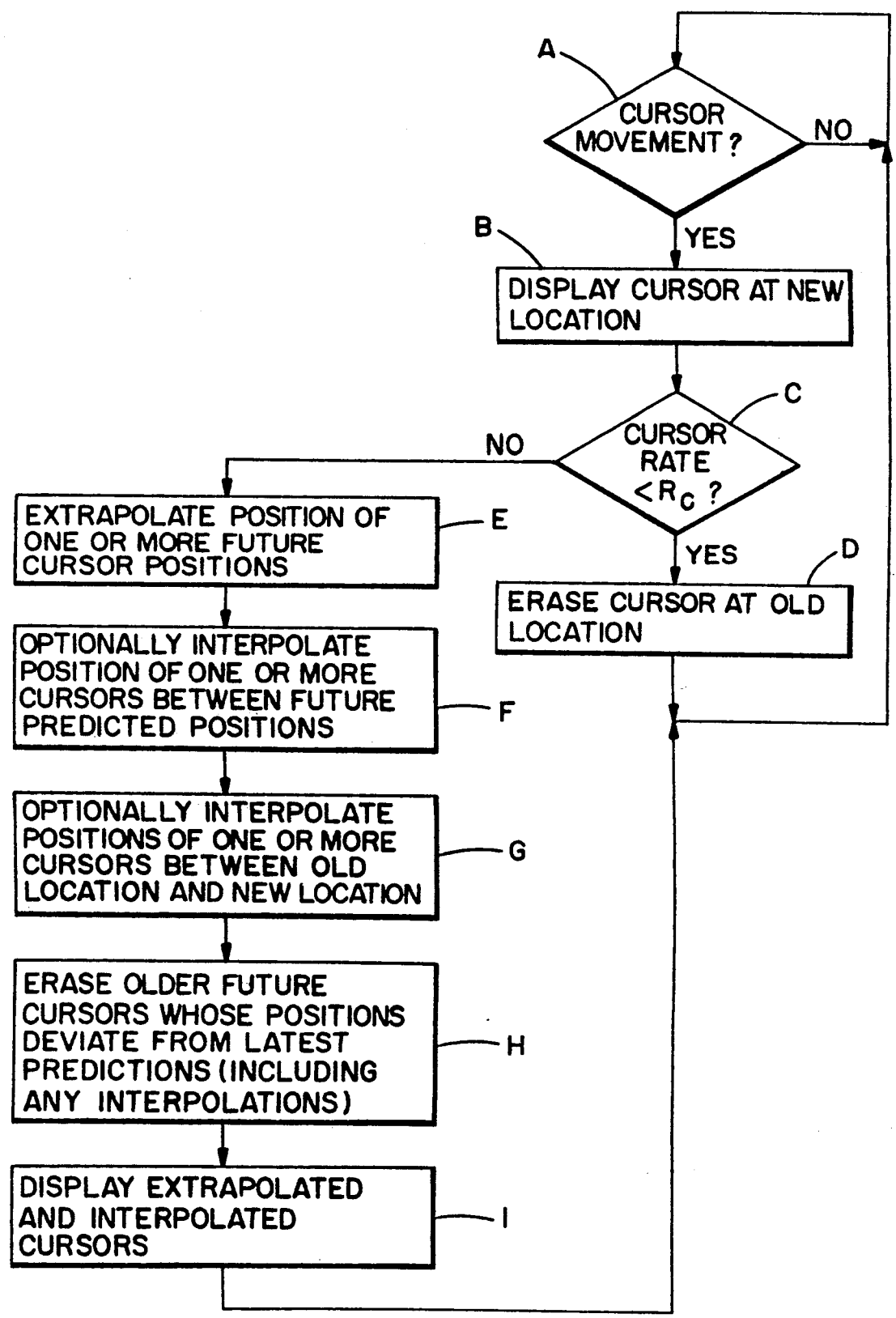
FIG. 4 is a flowchart illustrating a further method of the invention that also draws a cursor at one or more projected future cursor positions so as to reduce a required amount of time for the cursor to become visible.

Referring now to FIG. 4 there is shown a further method of the invention. Blocks A, B, C, and D correspond to blocks A, B, C, and D of FIG. 3. At block C, if the cursor rate is found to exceed the critical rate, control passes to block E where the processor 16 projects or extrapolates one or more future cursor positions (12c). This extrapolation is based on a projected path of the cursor, in view of a historical path, and is a function of one or more previous cursor positions and also on the previous rate of cursor motion. One consideration is that the extrapolated cursor position or positions should be at locations that may be reached by the cursor 12a within an interval of time that is less than $t_\nu$, to prevent an extrapolated cursor from becoming visible before the cursor 12a reaches the extrapolated location.

Having extrapolated the future cursor positions the processor 16 optionally interpolates one or more cursor positions that lie between the extrapolated future cursor positions (block F). Block G optionally interpolates one or more cursor positions that lie between an old cursor location and a new (present) cursor position. The operation of this block thus generates the cursor trail 12b. At block H there are erased all older future cursors 12c, including interpolated future cursors, whose positions deviate from a latest prediction. Interpolated cursors 12b that are displayed for a time equal to or exceeding $T_M$ are also erased. At block I the display controller 14 energizes the sets of pixels that correspond to the extrapolated and interpolated cursors.

The purpose of steps E and F is to cause the pixels that correspond to one or more future cursor positions to be at position $P_1$ on the curve of FIG. 2 when the pixels are required to be energized. This method thus biases certain of the LCD pixels so that a significantly shorter period of time is required to cause the pixels to become visually distinct after the pixels are required to be turned on.

For this method block B includes an unillustrated step of determining if the new location corresponds to the previously extrapolated location. If yes, the required pixels have already been energized and step B terminates. If no, the previously energized and biased pixels are turned off, preferably within an interval of time that is less than $t(\nu)$, and the appropriate set of pixels are energized.

It should be noted that certain steps of the invention may be performed in other than the order illustrated while obtaining the same result. Also, the cursor 12a may comprise any suitable number of pixels having any desired shape, such as an arrow, an underline, etc. Furthermore, the teaching of the invention is applicable to the display of any moving image on any type of display, and not only to images that function as cursors or indicators upon an LCD. One example is a moving football in a computer game to be played by the user. For this example the image of the football may include details such as the lacing on the side of ball. However, the images displayed at the interpolated locations need not be as detailed and may be ovals or any other arbitrarily simple shape for indicating the direction of the ball's movement.

It should further be noted that all or a portion of the cursor interpolation, extrapolation, and display functions may be accomplished by the display controller 14 independently of, or in concert with, the processor 16. For this case the display controller 14 is also coupled to an output of the pointing device 20, as indicated by the dashed line in FIG. 1.

Thus, while the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. A method for operating a display device that is coupled during use to a data processor, comprising the steps of:
   receiving an input signal that directs a movement of a displayed image object from a first location to a second location;
   displaying the image object at the second location;
   determining if a directed rate of movement of the image object between the first location and the second location is less than a predetermined maximum rate of movement;
   if it is determined that the directed rate of movement of the image object between the first location and the second location is less than the predetermined maximum rate of movement, the method includes a step of terminating the display of the image object at the first location;
   else, if it is determined that the rate of movement of the image object between the first location and the second location is not less than the predetermined maximum rate of movement, the method includes the further steps of,
   displaying a representation of the image object at one or more intermediate locations between the first location and the second location for visually indicating a direction of movement of the image object between the first location and the second location;
   determining if one or more of the representations of the displayed image object, and also the image object that is displayed at the first location, have been displayed for a period of time that is equal to or greater than a predetermined maximum period of time; and
   if so, terminating the display of the image object that is displayed at the first location, and any representations thereof, that are determined to have been displayed for a period of time equal to or greater than the predetermined maximum period of time.

2. A method as set forth in claim 1 wherein the step of displaying the image object at the second location and the step of displaying the representation of the image object at one or more intermediate locations each include a step of energizing a plurality of display device pixels, and wherein the predetermined maximum period of time has a value that is a function of an amount of time required for the display device pixels to become visually apparent after being energized.

3. A method as set forth in claim 1 wherein the step of displaying the image object at the second location includes a step of energizing a plurality of display device pixels, and wherein the predetermined maximum rate of movement has a value that is a function of an amount of time required for the display device pixels to become visually apparent after being energized.

4. A method as set forth in claim 1 wherein the step of displaying a representation of the image object includes a step of displaying a simplified image object.

5. A method of operating a display device that is coupled during use to a data processor, comprising the steps of:
   receiving an input signal that directs a movement of a displayed image object from a first location to a second location;
   displaying the image object at the second location;
   determining if a directed rate of movement of the image object between the first location and the second location is less than a predetermined maximum rate of movement;
   if it is determined that the directed rate of movement of the image object between the first location and the second location is less than the predetermined maximum rate of movement, the method includes a step of terminating the display of the image object at the first location;
   else, if it is determined that the rate of movement of the image object between the first location and the second location is not less than the predetermined maximum rate of movement, the method includes the further steps of,
   initiating a display of the image object at least one probable future location of the image object, the at least one probable future location being selected as a function of a previous location of the image object and also as a function of a previous directed rate of motion of the image object; and
   in response to a subsequent determination that a selected probable future location where the display of the image object has been initiated is not a correct location, terminating the display of the image object at the incorrect location before the image object becomes visually apparent.

6. A method as set forth in claim 5 wherein the step of initiating the display of the image object includes a step of energizing a plurality of display device pixels, and wherein the at lest one probable future location is selected also as a function of an amount of time required for the display device pixels to become visually apparent after being energized.

7. A method as set forth in claim 5 wherein the step of displaying the image object at the second location includes a step of energizing a plurality of display device pixels, and wherein the predetermined maximum rate of movement has a value that is a function of an amount of time required for the display device pixels to become visually apparent after being energized.

8. A method as set forth in claim 5 wherein the step of initiating the display of the image object includes the further step of:
   initiating the display of a representation of the image object at one or more intermediate locations between the second location and the at least one selected probable future location of the image object.

9. A method as set forth in claim 5 wherein the step of initiating the display of the image object includes the further step of:

displaying a representation of the image object at one or more intermediate locations between the first location and the second location for visually indicating a direction of movement of the image object between the first location and the second location.

10. Apparatus for controlling the operation of a liquid crystal display device, comprising:

a liquid crystal display device having a plurality of pixels;

control means coupled to the liquid crystal display device for controlling the energizing and de-energizing of said plurality of pixels so as to display an image object; and pointing means having an output coupled to said control means for providing a signal to said control means for specifying a direction of movement and a rate of movement of the displayed image object from a first location to a second location; wherein said control means is responsive to the signal for, displaying the image object at the second location;

for determining if a specified rate of movement of the image object between the first location and the second location is less than a predetermined maximum rate of movement; and in response to a determination by said control means that the specified rate of movement of the image object between the first location and the second location is not less than the predetermined maximum rate of movement, for displaying a representation of the image object at one or more intermediate locations between the first location and the second location for visually indicating a direction of movement of the image object between the first location and the second location;

for determining if one or more of the representations of the displayed image object, and also the image object that is displayed at the first location, have been displayed for a period of time that is equal to or greater than a predetermined maximum period of time; and if so, for terminating the display of th image object that is displayed at the first location, and any representations thereof, that are determined to have been displayed for a period of time equal to or greater than the predetermined maximum period of time.

11. Apparatus as set forth in claim 10 wherein the predetermined maximum period of time and also the predetermined maximum rate of movement each have a value that is a function of an amount of time required for the pixels to become visually apparent after being energized.

12. Apparatus for controlling the operation of a liquid crystal display device, comprising:

a liquid crystal display device having a plurality of pixels;

control mean coupled to the liquid crystal display device for controlling the energizing and de-energizing of said plurality of pixels so as to display an image object; and pointing means having an output coupled to said control means for providing a signal to said control means for specifying a direction of movement and a rate of movement of the displayed image object from a first location to a second location; wherein said control means is responsive to the signal for, displaying the image object at the second location;

for determining if a specified rate of movement of the image object between the first location and the second location is less than a predetermined maximum rate of movement; and in response to a determination by said control means that the specified rate of movement of the image object between the first location and the second location is not less than the predetermined maximum rate of movement, for initiating a display of the image object at least one probable future location of the image object, the at least one probable future location being selected as a function of a previous location of the image object and as a function of a previous specified rate of motion of the image object; and in response to a subsequent determination by said control means that a probable future location where the display of the image object has been initiated is not a correct location, for terminating the display of the image object at the incorrect location before the image object becomes visually apparent.

13. Apparatus as set forth in claim 12 wherein the at least one probable future location is selected also as a function of an amount of time required for the pixels to become visually apparent after being energized.

* * * * *